United States Patent [19]

Baralle et al.

[11] 4,306,017

[45] Dec. 15, 1981

[54] PHOTOGRAPHIC EMULSIONS AND ELEMENTS CAPABLE OF FORMING DIRECT-POSITIVE IMAGES

[75] Inventors: Roger M. Baralle, Champigny-sur-Marne; Marcel A. Comperè, Fontenay-sous-Bois; Maurice E. Pfaff, Le Perreux-sur-Marne; Frédéric X. Jordi, Paris; Claude G. Goumont, Chelles, all of France

[73] Assignee: Eastman Kodak Company, Rochester, N.Y.

[21] Appl. No.: 207,814

[22] Filed: Nov. 17, 1980

[51] Int. Cl.³ ............................................... G03C 5/24
[52] U.S. Cl. .................................... 430/410; 430/589; 430/598
[58] Field of Search .................... 430/410, 589, 598

[56] References Cited

U.S. PATENT DOCUMENTS

| | | |
|---|---|---|
| 3,227,552 | 1/1966 | Whitmore . |
| 3,615,615 | 10/1971 | Lincoln et al. . |
| 3,719,494 | 3/1973 | Kurtz et al. . |
| 3,734,738 | 5/1973 | Kurtz et al. . |
| 3,759,901 | 9/1973 | Lincoln et al. . |
| 3,850,638 | 11/1974 | Willis et al. .......................... 430/410 |
| 3,964,911 | 6/1976 | Robillard . |
| 4,030,925 | 6/1977 | Leone et al. . |
| 4,080,207 | 3/1978 | Leone et al. . |
| 4,115,122 | 9/1978 | Adachi et al. . |
| 4,139,387 | 2/1979 | von Konig et al. . |
| 4,989,530 | 11/1976 | Robillard . |

FOREIGN PATENT DOCUMENTS

| | | |
|---|---|---|
| 2011391 | 7/1979 | United Kingdom . |
| 2012443 | 7/1979 | United Kingdom . |

OTHER PUBLICATIONS

Samat et al., "Bicondensation Adducts of Salicylic Aldehydes on Benzoheterocycloammonium Salts. Potential Applications to Thermographic Recording Process", *Journal of Photo. Sci.*, 26, 1978, pp. 34-43.

*Primary Examiner*—Mary F. Downey
*Attorney, Agent, or Firm*—Carl O. Thomas

[57] ABSTRACT

Silver halide emulsions are disclosed containing silver halide grains capable of forming an internal latent image. Incorporated in the emulsions as a nucleating agent is a dihydrospiropyran bis-condensation product of salicylic aldehyde and at least one heterocyclic ammonium salt, thereby permitting a direct-positive image to be formed on imagewise exposure and photographic processing.

20 Claims, No Drawings

PHOTOGRAPHIC EMULSIONS AND ELEMENTS CAPABLE OF FORMING DIRECT-POSITIVE IMAGES

FIELD OF THE INVENTION

The present invention is directed to silver halide emulsions and photographic elements useful in forming direct-positive images. More specifically, this invention is directed to internal latent image-forming silver halide emulsions containing a nucleating agent and to photographic elements containing these emulsions. This invention is also directed to processes of forming direct-positive images.

BACKGROUND OF THE INVENTION

Photographic elements which produce images having an optical density directly related to the radiation received on exposure are said to be negative-working. A positive photographic image can be formed by producing a negative photographic image and then forming a second photographic image which is a negative of the first negative, that is, a positive image. A direct-positive image is understood in photography to be a positive image that is formed without first forming a negative image. Positive dye images which are not direct-positive images are commonly produced in color photography by reversal processing in which a negative silver image is formed and a complementary positive dye image is then formed in the same photographic element. The term "direct reversal" has been applied to direct-positive photographic elements and processing which produces a positive dye image without forming a negative silver image. Direct-positive photography in general and direct reversal photography in particular are advantageous in providing a more straightforward approach to obtaining positive photographic images.

A conventional approach to forming direct-positive images is to use photographic elements employing internal latent image-forming silver halide grains. After imagewise exposure, the silver halide grains are developed with a surface developer, that is, one which will leave the latent image sites within the silver halide grains substantially unrevealed. Simultaneously, either by uniform light exposure or by the use of a nucleating agent, the silver halide grains are subjected to development conditions that would cause fogging of a negative-working photographic element. The internal latent image-forming silver halide grains which received actinic radiation during imagewise exposure develop under these conditions at a comparatively slow rate, as compared to the internal latent image-forming silver halide grains not imagewise exposed. The result is a direct-positive silver image. In color photography, the oxidized developer that is produced during silver development is used to produce a corresponding positive, direct reversal dye image. Multicolor direct reversal photographic images have been extensively investigated in connection with image-transfer photography.

It has been found advantageous to employ nucleating agents in preference to uniform light exposure in the process described above. The term "nucleating agent" is employed herein to mean a fogging agent capable of permitting the selective development of internal latent image-forming silver halide grains which have not been imagewise exposed in preference to the development of silver halide grains having an internal latent image formed by imagewise exposure.

While nucleating agents have been long known to the photographic art, recent interest has focused on identifying nucleating agents that are effective in relatively low concentration levels and that can be incorporated directly into silver halide emulsions. Exemplary of known incorporated nucleating agents are those disclosed by Whitmore U.S. Pat. No. 3,227,552, Lincoln et al U.S. Pat. No. 3,615,615, Kurtz et al U.S. Pat. Nos. 3,719,494 and 3,734,738, Lincoln et al U.S. Pat. No. 3,759,901, Leone et al U.S. Pat. Nos. 4,030,925 and 4,080,207, Adachi et al U.S. Pat. No. 4,115,122, von Konig et al U.S. Pat. No. 4,139,387, and U.K. Pat. Nos. 2,011,391 and 2,012,443.

Robillard U.S. Pat. No. 3,964,911 teaches employing as a photothermographic imaging composition (1) a diazonium salt capable of photodecomposing to form a phenol and (2) a spiropyran capable of photodecomposing to form a merocyanine dye. The photo-generated phenol and merocyanine can combine in a molten solvent during processing to form a colored complex. Another discussion of this subject matter is provided by Samat et al, "Bicondensation Adducts of Salicylic Aldehydes on Benzoheterocycloammonium Salts, Potential Applications to Thermographic Recording Process," *The Journal of Photographic Science*, Vol. 26, 1978, pp. 34–43. Robillard U.S. Pat. No. 3,989,530 suggests the use of spiropyrans in forming phase holograms.

SUMMARY OF THE INVENTION

In one aspect this invention is directed to a silver halide emulsion comprised of silver halide grains capable of forming an internal latent image and, adsorbed to the surface of the silver halide grains, a nucleating amount of a dihydrospiropyran bis-condensation product of a salicylic aldehyde and at least one heterocyclic ammonium salt.

In another aspect this invention is directed to a photographic element comprised of a support and at least one layer of a silver halide emulsion as described above.

In still another aspect this invention is directed to an improved process of producing a visible image in an imagewise exposed photographic element having a support and, coated on the support, a silver halide emulsion layer comprising silver halide grains capable of forming an internal latent image and, adsorbed to the surface of the silver halide grains, a nucleating agent in an amount sufficient to promote development of unexposed silver halide grains comprising processing in a aqueous alkaline surface developing composition in the presence of a developing agent. The improvement comprises developing in the presence of a dihydrospiropyran bis-condensation product of salicylic aldehyde with at least one heterocyclic ammonium salt.

DESCRIPTION OF PREFERRED EMBODIMENTS

The nucleating agents employed in the practice of this invention are dihydrospiropyran bis-condensation products of salicylic aldehyde and at least one heterocyclic ammonium salt. Such condensation products can be formed by procedures taught by Samat et al, cited above.

In a preferred form the nucleating agent is a dihydrospiropyran of the formula

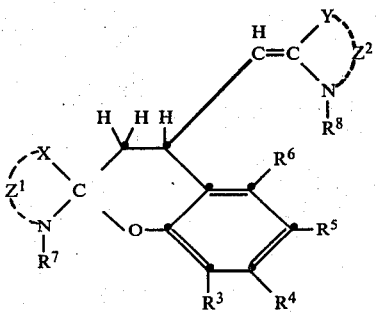

wherein

X and Y each independently represent a sulfur atom, a selenium atom or a —C($R^1R^2$)—radical, $R^1$ and $R^2$ independently represent lower alkyl of from 1 to 5 carbon atoms or together represent an alkylene radical of 4 or 5 carbon atoms, $R^3$, $R^4$, $R^5$, and $R^6$ each represent hydrogen, a hydroxy radical or a lower alkyl or alkoxy radical of from 1 to 5 carbon atoms, $Z^1$ and $Z^2$ each represents the nonmetallic atoms completing a nitrogen-containing heterocyclic nucleus of the type found in cyanine dyes and $R^7$ and $R^8$ each represent a ring nitrogen substituent of the type found in cyanine dyes.

$Z^1$ and $Z^2$ in a preferred form each completes a 5- or 6-membered ring, preferably fused with at least one benzene ring, containing in the ring structure carbon atoms, a single nitrogen atom and, optionally, a sulfur or selenium atom. For instance, $Z^1$ and $Z^2$ can each complete a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole);

a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymthylenebenzothiazole, 5-hydroxybenzothiazole, 6-hydroxybenzothiazole, 6-acetamidobenzotriazole), a naphthothiazole nucleus (e.g., naphtho[2,1-d]thiazole, 5-methoxynaphtho[2,3-d]thiazole, 5-ethoxynaphtho[1,2-d]thiazole, 7-methoxynaphtho[2,1]-thiazole, 8-methoxynaphtho[2,1-d]thiazole), a selenazole nucleus (e.g., 4-methylselenazole and 4-phenylsenenazole), a benzoselenazole nucleus (e.g., benzoselenazole, 5-chlorobenzoselenazole, 5-methoxybenzoselenazole, 5-hydroxybenzoselenazole and tetrahydrobenzoselenazole), a naphthoselenazole nucleus (e.g., α-naphthoselenazole and β-naphthoselenazole), a thiazoline nucleus (e.g., thiazoline and 4-methylthiazoline), and a 3,3-dialkylindoleine nucleus (e.g., 3,3-dimethylindolenine, 5-nitro-3,3-dimethylindolenine, 6-nitro-3,3-dimethylindolenine, 5-cyano-3,3-dimethylindolenine, 6-cyano-3,3-dimethylindolenine, 3,3,5-trimethylindolenine, and 3,3,7-trimethylindolenine).

$R^1$, $R^2$, $R^3$, $R^4$, $R^5$, and $R^6$ can each be a lower alkyl radical independent of the others. a preferred lower alkyl radical is methyl. Ethyl, propyl, iso-propyl, n-butyl, iso-butyl, tert-butyl, n-pentyl, iso-pentyl, tert-pentyl and neo-pentyl lower alkyl radicals are also contemplated. The preferred lower alkoxy radical is methoxy, but any lower alkoxy radical corresponding to the above-mentioned lower alkyl radicals can be employed. In a specifically preferred form $R^1$ and $R^2$ are both methyl when present, $R^3$ is hydrogen or methoxy and $R^4$, $R^5$ and $R^6$ are hydrogen.

$R^7$ and $R^8$ each represents a ring nitrogen substituent of the type found in cyanine dyes. Such substituent is commonly (1) an alkyl group (including a substituted alkyl group) having 1 to 18 carbon atoms, such as, methyl, ethyl, propyl, isopropyl, butyl, isobutyl, pentyl, hexyl, heptyl, octyl, nonyl, decyl, undecyl, dodecyl, tridecyl, tetradecyl, pentadecyl, hexadecyl, heptadecyl, and octadecyl, or a substituted alkyl group, such as, a hydroxyalkyl group, such as, β-hydroxyethyl, γ-hydroxypropyl, β-hydroxypropyl, γ-hydroxybutyl, and ω-hydroxybutyl;

an alkoxyalkyl group, such as, β-methoxyethyl, β-ethoxyethyl, β-butoxyethyl, γ-methoxypropyl, γ-ethoxypropyl, ω-methoxybutyl, ω-ethoxybutyl, and ω-butoxybutyl;

a carboxyalkyl group, such as, carboxymethyl, β-carboxyethyl, γ-carboxypropyl, and ω-carboxybutyl;

a sulfoalkyl group, such as, β-sulfoethyl, γ-sulfopropyl, γ-sulfobutyl, and ω-sulfobutyl;

a sulfatoalkyl group, such as, β-sulfatoethyl, γ-sulfatopropyl, γ-sulfatobutyl, and ω-sulfatobutyl;

an alkanoyloxyalkyl group, such as, β-acetoxyethyl, β-propionyloxyethyl, β-butyryloxyethyl, γ-acetoxypropyl, γ-propionyloxypropyl, ω-acetoxybutyl, ω-propionyloxybutyl, and ω-butyryloxybutyl; and an alkoxycarbonylalkyl group, such as, methoxycarbonylmethyl, β-methoxycarbonylethyl, β-ethoxycarbonylethyl, γ-methoxycarbonylpropyl, γ-ethoxycarbonylpropyl, ω-methoxycarbonylbutyl, and ω-ethoxycarbonylbutyl;

(2) an aralkyl group, e.g., benzyl, phenethyl; (3) an alkenyl group of from 2 to 4 carbon atoms, e.g., allyl, propenyl, 1-butenyl, 2-butenyl; (4) an aryl group, e.g., phenyl, chlorophenyl, sulfophenyl, carboxyphenyl, methoxyphenyl, or naphthyl; or (5) an alkaryl group, e.g., tolyl, ethylphenyl, or xylyl. In a specific preferred form the aryl moieties contain 6 to 10 (most preferably 10) carbon atoms and the alkyl moieties up to 5 carbon atoms.

Although the nucleating agents are described as dihydrospiropyrans, it is appreciated that comparable synthetic techniques can be employed to produce corresponding dihydrospirothiapyrans, which are expected to have similar nucleating activity.

The dihydrospiropyran nucleating agents can be employed with any conventional photographic element capable of forming a direct-positive image containing, coated on a photographic support, at least one silver halide emulsion layer containing a vehicle and silver halide grains capable of forming an internal latent image upon exposure to actinic radiation. As employed herein, the terms "internal latent image silver halide grains" and "silver halide grains capable of forming an internal latent image" are employed in the art-recognized sense of designating silver halide grains which produce substantially higher optical densities when coated, imagewise exposed and developed in an internal developer than when comparably coated, exposed and developed in a surface developer. Preferred internal latent image silver halide grains are those which, when examined according to normal photographic testing techniques, by coating a test portion on a photographic support (e.g., at a coverage of from 3 to 4 grams per square meter), exposing to a light intensity scale (e.g., with a 500-watt tungsten lamp at a distance of 61 cm) for a fixed time (e.g., between $1 \times 10^{-2}$ and 1 second) and developing for 5 minutes at 25° C. in Kodak Developer DK-50 (a surface developer), provide a density of at least 0.5 less than when this testing procedure is repeated, substituting for the surface developer Kodak Developer DK-50 containing 0.5 gram per liter of potassium iodide (an internal developer). The internal latent image silver halide grains most preferred for use in the practice of this invention are those which, when tested using an internal developer and a surface developer as indicated above, produce an optical density with the internal developer at least 5 times that produced by the surface developer. It is additionally preferred that the internal latent image silver halide grains produce an optical density of less than 0.4 and, most preferably, less than 0.25 when coated, exposed and developed in surface developer as indicated above, that is, the silver halide grains are preferably initially substantially unfogged and free of latent image on their surface.

The surface developer referred to herein as Kodak Developer DK-50 is described in the *Handbook of Chemistry and Physics*, 30th edition, 1947, Chemical Rubber Publishing Company, Cleveland, Ohio, page 2558, and has the following composition:

| Water, about 125° F. (52° C.) | 500.0 cc |
|---|---|
| N-methyl-p-aminophenol sulfate | 2.5 g |
| Sodium sulfite, desiccated | 30.0 g |
| Hydroquinone | 2.5 g |
| Sodium metaborate | 10.0 g |
| Potassium bromide | 0.5 g |
| Water to make | 1.0 liter. |

Internal latent image silver halide grains which can be employed in the practice of this invention are well known in the art. Patents teaching the use of internal latent image silver halide grains in photographic emulsions and elements include Knott et al U.S. Pat. No. 2,463,953, Ives U.S. Pat. No. 2,563,785, Davey et al U.S. Pat. No. 2,592,250, Porter et al U.S. Pat. No. 3,206,313, Gilman et al U.S. Pat. No. 3,761,267, Evans U.S. Pat. Nos. 3,761,276, 3,850,637, and 3,923,513, and Evans et al U.S. Pat. No. 4,035,185, here incorporated by reference.

The internal latent image silver halide grains preferably contain bromide as the predominant halide. The silver bromide grains can consist essentially of silver bromide or can contain silver bromoiodide, silver chlorobromide, silver chlorobromoiodide crystals and mixtures thereof. Internal latent image-forming sites can be incorporated into the grains by either physical or chemical internal sensitization. Davey et al, cited above, for example, teaches the physical formation of internal latent imge-forming sites by the halide conversion technique. Chemical formation of internal latent image-forming sites can be produced through the use of sulfur, gold, selenium, tellurium and/or reduction sensitizers of the type described, for example, in Sheppard et al U.S. Pat. No. 1,623,499, Waller et al U.S. Pat. No. 2,399,083, McVeigh U.S. Pat. No. 3,297,447, and Dunn U.S. Pat. No. 3,297,446, as taught in the patents cited in the preceding paragraph. Internal latent image sites can also be formed through the incorporation of metal dopants, particularly Group VIII noble metals, such as, ruthenium, rhodium, palladium, iridium, osmium and platinum, as taught by Berriman U.S. Pat. No. 3,367,778. The preferred foreign metal ions are polyvalent metal ions which include the above-noted Group VIII dopants, as well as polyvalent metal ions, such as, lead, antimony, bismuth, arsenic and the like. In other preferred embodiments, the silver halide grains may be formed in the presence of bismuth, lead or iridium ions. In a preferred approach, the internal latent image sites can be formed within the silver halide grains during precipitation of silver halide. In an alternate approach, a core grain can be formed which is treated to form the internal image sites and then a shell deposited over the core grains, as taught by Porter et al, cited above.

The silver halide grains employed in the practice of this invention are preferably monodispersed, and in some embodiments are preferably large-grain emulsions made according to Wilgus German OLS No. 2,107,118, which is incorporated herein by reference. The monodispersed emulsions are those which comprise silver halide grains having a substantially uniform diameter. Generally, in such emulsions, no more than about 5 percent by number of the silver halide grains smaller than the mean grain size and/or no more than about 5 percent by number of the silver halide grains larger than the mean grain size vary in diameter from the mean grain diameter by more than about 40 percent. Preferred photographic emulsions of this invention comprise silver halide grains, at least 95 percent by weight of said grains having a diameter which is within 40 percent and preferably within about 30 percent of the mean grain diameter. Mean grain diameter, i.e., average grain size, can be determined using conventional methods, e.g., such as, projective area, as shown in an article by Trivelli et al entitled "Empirical Relations Between Sensitometric and Size-Frequency Characteristics in Photographic Emulsion Series" in *The Photographic Journal*, Volume LXXIX, 1939, pages 330 through 338. The aforementioned uniform size distribution of silver halide grains is a characteristic of the grains in monodispersed photographic silver halide emulsions. Silver halide grains having a narrow size distribution can be obtained by controlling the conditions at which the silver halide grains are prepared using a double run procedure. In such a procedure, the silver halide grains are prepared by simultaneously running an aqueous solution of a silver salt, such as, silver nitrate, and an aqueous solution of a water-soluble halide, for example, an alkali metal halide, such as, potassium bromide, into a rapidly agitated aqueous solution of a silver halide peptizer, preferably gelatin, a gelatin derivative or some other protein peptizer. Suitable methods for preparing photographic silver halide emulsions having the required uniform particle size are disclosed in an article entitled "Ia: Properties of Photographic Emulsion Grains", by Kelin and Mosiar, *The Journal of Photographic Science*, Volume 12, 1964, pages 242 through 251; an article entitled "The Spectral Sensitization of Silver Bromide Emulsions on Different Crystallographic Faces", by Markocki, *The Journal of Photographic Science*, Volume 13, 1965, pages 85 through 89;

an article entitled "Studies on Silver Bromide Sols, Part I. The Formation and Aging of Monodispersed Silver Bromide Sols", by Ottewill and Woodbridge, *The Journal of Photographic Science,* Volume 13, 1965, pages 98 through 103; and an article entitled "Studies on Silver Bromide Sols, Part II. The Effect of Additives on the Sol Particles", by Ottewill and Woodbridge, *The Journal of Photographic Science,* Volume 13, 1965, pages 104 through 107.

Where internal latent image sites have been formed through internal chemical sensitization or the use of metal dopants, the surface of the silver halide grains can be sensitized to a level below that which will produce substantial density in a surface developer, that is, less than 0.4 (preferably less than 0.25) when coated, exposed and surface developed as described above. The silver halide grains are preferably predominantly silver bromide grains chemically surface sensitized to a level which would provide a maximum density of at least 0.5 using undoped silver halide grains of the same size and halide composition when coated, exposed and developed as described above.

Surface chemical sensitization can be undertaken using techniques, such as, those disclosed by Sheppard, Waller et al., McVeigh or Dunn, cited above. The silver halide grains can also be surface sensitized with salts of the noble metals, such as, ruthenium, palladium and platinum. Representative compounds are ammonium chloropalladate, potassium chloroplatinate and sodium chloropalladite, which are used for sensitizing in amounts below that which produces any substantial fog inhibition, as described in Smith et al U.S. Pat. No. 2,448,060, and as antifoggants in higher amounts, as described in Trivelli et al U.S. Pat. Nos. 2,566,245 and 2,566,263. The silver halide grains can also be chemically sensitized with reducing agents, such as stannous salts (Carroll U.S. Pat. No. 2,487,850, polyamines, such as diethylene triamine (Lowe et al U.S. Pat. No. 2,518,698), polyamines, such as spermine (Lowe et al U.S. Pat. No. 2,521,925), or bis-($\beta$-aminoethyl)sulfide and its watersoluble salts (Lowe et al U.S. Pat. No. 2,521,926).

The photographic silver halide emulsion layers and other layers of the photographic elements can contain various colloids alone or in combination as vehicles. Suitable hydrophilic materials include both naturally occurring substances, such as, proteins, protein derivatives, cellulose derivatives, e.g., cellulose esters, gelatin, e.g., alkali-treated gelatin (cattle bone or hide gelatin) or acid-treated gelatin (pigskin gelatin), gelatin derivatives, e.g., acetylated gelatin, phthalated gelatin and the like, polysaccharides, such as, dextran, gum arabic, zein, casein, pectin, collagen derivatives, collodion, agar-agar, arrowroot, albumin and the like, as described in Yutzy U.S. Pat. Nos. 2,614,928 and '929, Lowe et al U.S. Pat. Nos. 2,691,582, 2,614,930 and '931, 2,327,808, and 2,448,534, Gates et al U.S. Pat. Nos. 2,787,545 and 2,956,880, Himmelmann et al U.S. Pat. No. 3,061,436, Farrell et al U.S. Pat. No. 2,816,027, Ryan U.S. Pat. Nos. 3,132,945, 3,138,461, and 3,186,846, Dersch et al U.K. Pat. Nos. 1,167,159 and U.S. Pat. Nos. 2,960,405 and 3,436,220, Geary U.S. Pat. No. 3,486,896, Gazzard U.K. Pat. No. 793,549, Gates et al U.S. Pat. Nos. 2,992,213, 3,157,506, 3,184,312, and 3,539,353, Miller et al U.S. Pat. No. 3,227,571, Boyer et al U.S. Pat. No. 3,532,502, Malan U.S. Pat. No. 3,551,151, Lohmer et al U.S. Pat. Nos. 4,018,609, Luciani et al U.K. Pat. No. 1,186,790, Hori et al U.K. Pat. No. 1,489,080 and Belgian Pat. No. 856,631, U.K. Pat. No. 1,490,644, U.K. Pat. No. 1,483,551, Arase et al U.S. Pat. No. 1,459,906, Salo U.S. Pat. Nos. 2,110,491 and 2,311,086, Fallesen U.S. Pat. No. 2,343,650, Yutzy U.S. Pat. No. 2,322,085, Lowe U.S. Pat. No. 2,563,791, Talbot et al U.S. Pat. No. 2,725,293, Hilborn U.S. Pat. No. 2,748,022, DePauw et al U.S. Pat. No. 2,956,883, Ritchie U.K. Pat. No. 2,095, DeStubner U.S. Pat. No. 1,752,069, Sheppard et al U.S. Pat. No. 2,127,573, Lierg U.S. Pat. No. 2,256,720, Gaspar U.S. Pat. No. 2,361,936, Farmer U.K. Pat. No. 15,727, Stevens U.K. Pat. No. 1,062,116, and Yamamoto et al U.S. Pat. No. 3,923,517.

Photographic emulsion layers, and other layers of photographic elements, such as, overcoat layers, interlayers, and subbing layers, as well as receiving layers in image-transfer elements, can also contain alone or in combination with hydrophilic water-permeable colloids as vehicles or vehicle extenders (e.g., in the form of latices), synthetic polymeric peptizers, carriers and/or binders, such as, poly(vinyl lactams), acrylamide polymers, polyvinyl alcohol, and its derivatives, polyvinyl acetals, polymers of alkyl, and sulfoalkyl acrylates, and methacrylates, hydrolyzed polyvinyl acetates, polyamides, polyvinyl pyridine, acrylic acid polymers, maleic anhydride copolymers, polyalkylene oxides, methacrylamide copolymers, polyvinyl oxazolidinones, maleic acid copolymers, vinylamine copolymers, methacrylic acid copolymers, acryloyloxyalkylsulfonic acid copolymers, sulfoalkylacrylamide copolymers, polyalkyleneimine copolymers, polyamines, N,N-dialkylaminoalkyl acrylates, vinyl imidazole copolymers, vinyl sulfide copolymers, halogenated styrene polymers, amineacrylamide polymers, polypeptides and the like, as described in Hollister et al U.S. Pat. Nos. 3,679,425, 3,706,564, and 3,813,251, Lowe U.S. Pat. Nos. 2,253,078, 2,276,322 and '323, 2,281,703, 2,311,058, and 2,414,207, Lowe et al U.S. Pat. Nos. 2,484,456, 2,541,474, and 2,632,704, Perry et al U.S. Pat. No. 3,425,836, Smith et al U.S. Pat. Nos. 3,415,653 and 3,615,624, Smith U.S. Pat. No. 3,488,708, Whiteley et al U.S. Pat. Nos. 3,392,025 and 3,511,818, Fitzgerald U.S. Pat. Nos. 3,681,079, 3,721,565, 3,852,073, 3,861,918, and 3,925,083, Fitzgerald et al U.S. Pat. No. 3,879,205, Nottorf U.S. Pat. No. 3,142,568, Houck et al U.S. Pat. Nos. 3,062,674 and 3,220,844, Dann et al U.S. Pat. No. 2,882,161, Schupp U.S. Pat. No. 2,579,016, Weaver U.S. Pat. No. 2,829,053, Alles et al U.S. Pat. No. 2,698,240, Priest et al U.S. Pat. No. 3,003,879, Merrill et al U.S. Pat. No. 3,419,397, Stonham U.S. Pat. No. 3,284,207, Lohmer et al U.S. Pat. No. 3,167,430, Williams U.S. Pat. No. 2,957,767 Dawson et al U.S. Pat. No. 2,893,867, Smith et al U.S. Pat. Nos. 2,860,986 and 2,904,539, Ponticello et al U.S. Pat. Nos. 3,929,482 and 3,860,428, Ponticello U.S. Pat. No. 3,939,130, Dykstra U.S. Pat. No. 3,411,911, Dykstra et al Canadian Pat. No. 774,054, Ream et al U.S. Pat. No. 3,287,289, Smith U.K. Pat. No. 1,466,600, Stevens U.K. Pat. No. 1,062,116, Fordyce U.S. Pat. No. 2,211,323, Martinez U.S. Pat. No. 2,284,877, Watkins U.S. Pat. No. 2,420,455, Jones U.S. Pat. No. 2,533,166, Bolton U.S. Pat. No. 2,495,918, Graves U.S. Pat. No. 2,289,775, Yackel U.S. Pat. No. 2,565,418, Unruh et al U.S. Pat. Nos. 2,865,893 and 2,875,059, Rees et al U.S. Pat. No. 3,536,491, Broadhead et al U.K. Pat. No. 1,348,815, Taylor et al U.S. Pat. No. 3,479,186, Merrill et al U.S. Pat. No. 3,520,857, Bacon et al U.S. Pat. No. 3,690,888, Bowman U.S. Pat. No. 3,748,143, Dickinson et al U.K. Pat. Nos. 808,227 and '228, Wood U.K. Pat. No. 822,192, and Iguchi et al U.K. Pat. No. 1,398,055.

The layers of the photographic elements can be coated on a variety of supports. Typical photographic supports include polymeric film, wood fiber, e.g., paper, metallic sheet and foil, glass and ceramic supporting elments provided with one or more subbing layers to enhance the adhesive, antistatic, dimensional, abrasive, hardness, frictional, antihalation, and/or other properties of the support surface.

Typical of useful polymeric film supports are films of cellulose nitrate and cellulose esters, such as, cellulose triacetate and diacetate, polystyrene, polyamides, homo-polymers and co-polymers of vinyl chloride, poly(vinyl acetal), polycarbonate, homo-polymers and co-polymers of olefins, such as, polyethylene and polypropylene, and polyesters of dibasic aromatic carboxylic acids with divalent alcohols, such as, poly(ethylene terephthalate).

Typical of useful paper supports are those which are partially acetylated or coated with baryta and/or a polyolefin, particularly a polymer of an α-olefin containing 2 to 10 carbon atoms, such as, polyethylene, polypropylene, copolymers of ethylene and propylene and the like.

Polyolefins, such as, polyethylene, polypropylene and polyallomers, e.g., copolymers of ethylene with propylene, as illustrated by Hagemeyer et al U.S. Pat. No. 3,478,128, are preferably employed as resin coatings over paper, as illustrated by Crawford et al U.S. Pat. No. 3,411,908 and Joseph et al U.S. Pat. No. 3,630,740, over polystyrene and polyester film supports, as illustrated by Crawford et al U.S. Pat. No. 3,630,742, or can be employed as unitary flexible reflection supports, as illustrated by Venor et al U.S. Pat. No. 3,973,963.

Preferred cellulose ester supports are cellulose triacetate supports, as illustrated by Fordyce et al U.S. Pat. Nos. 2,492,977, '978, and 2,739,069, as well as mixed cellulose ester supports, such as, cellulose acetate propionate and cellulose acetate butyrate, as illustrated by Fordyce et al U.S. Pat. No. 2,739,070.

Preferred polyester film supports are comprised of linear polyester, such as illustrated by Alles et al U.S. Pat. No. 2,627,088, Wellman U.S. Pat. No. 2,720,503, Alles U.S. Pat. No. 2,779,684, and Kibler et al U.S. Pat. No. 2,901,466. Polyester films can be formed by varied techniques, as illustrated by Alles, cited above, Czerkas et al U.S. Pat. No. 3,663,683, and Williams et al U.S. Pat. No. 3,504,075, and modified for use as photographic film supports, as illustrated by Van Stappen U.S. Pat. No. 3,227,576, Nadeau et al U.S. Pat. No. 3,501,301, Reedy et al U.S. Pat. No. 3,589,905, Babbitt et al U.S. Pat. No. 3,850,640, Bailey et al U.S. Pat. No. 3,888,678, Hunter U.S. Pat. No. 3,904,420, and Mallinson et al U.S. Pat No. 3,928,697.

The photographic elements can employ supports which are resistant to dimensional change at elevated temperatures. Such supports can be comprised of linear condensation polymers which have glass transition temperatures above about 190° C., preferably 220° C., such as, poly carbonates, polycarboxylic esters, polyamides, polysulfonamides, polyethers, polyimides, polysulfonates and copolymer variants, as illustrated by Hamb U.S. Pat. Nos. 3,634,089 and 3,772,405, Hamb et al U.S. Pat. Nos. 3,725,070 and 3,793,249, Wilson *Research Disclosure*, Volume 118, February 1974, Item 11833, and Volume 120, April 1974, Item 12046, Conklin et al *Research Disclosure*, Volume 120, April 1974, Item 12012, *Product Licensing Index*, Volume 92, December 1971, Items 9205 and 9207, *Research Disclosure*, Volume 101, September 1972, Items 10119 and 10148, *Research Disclosure*, Volume 106, February 1973, Item 10613, *Research Disclosure*, Volume 117, January 1974, Item 11709, and *Research Disclosure*, Volume 134, June 1975, Item 13455. Both *Research Disclosure* and *Product Licensing Index* are published by Industrial Opportunities, Ltd., Homewell, Havant, Hampshire, P09 1EF, United Kingdom.

The dihydrospiropyran nucleating agents of this invention can be employed in any desired concentration that will permit a degree of selectivity in developing imagewise silver halide grains capable of forming an internal latent image, which grains have not been imagewise exposed, as compared to silver halide grains containing an internal latent image formed by imagewise exposure. In a preferred form the dihydrospiropyran nucleating agents are adsorbed to the surface of the internal latent image silver halide grains and employed in concentrations ranging from $10^{-4}$ to $10^{-2}$ mole per mole of silver halide. Where the dihydrospiropyran nucleating agent is to be adsorbed to the surface of the silver halide grains, it can be adsorbed using the procedures well known to those skilled in the art for adsorbing sensitizing dyes, such as, cyanine and merocyanine dyes, to the surface of silver halide grains.

A simple exposure and development process can be used to form a direct-positive image. In one embodiment, a photographic element comprising at least one layer of a silver halide emulsion as described above can be imagewise exposed to light and then developed in a silver halide surface developer.

It is understood that the term "surface developer" encompasses those developers which will reveal the surface latent image on a silver halide grain, but will not reveal substantial internal latent image in an internal image-forming emulsion, and under the conditions generally used develop a surface-sensitive silver halide emulsion. The surface developers can generally utilize any of the silver halide developing agents or reducing agents, but the developing bath or composition is generally substantially free of a silver halide solvent (such as water-soluble thiocyanates, water-soluble thioethers, thiosulfates, ammonia) which will disrupt or dissolve the grain to reveal substantial internal image. Low amounts of excess halide are sometimes desirable in the developer or incorporated in the emulsion as halide-releasing compounds, but high amounts of iodide or iodide-releasing compounds are generally avoided to prevent substantial disruption of the grain. Typical silver halide developing agents which can be used in the developing compositions of this invention include hydroquinones, catechols, aminophenols, 3-pyrazolidones, ascorbic acid and its derivatives, reductones and color developing agents, that is, primary aromatic amine developing agents, such as, aminophenols and para-phenylenediamines. The color developing agents are preferably employed in combination with black-and-white developing agents capable of acting as electron transfer agents. Illustrative of useful surface developers are those disclosed in Ives U.S. Pat. No. 2,563,785, Evans U.S. Pat. No. 3,761,276, Knott et al U.S. Pat. No. 2,456,953, and Juoy U.S. Pat. No. 3,511,662.

Where the developing agents are initially entirely incorporated in the photographic elements, the remaining components (e.g., water, activators to adjust pH, preservatives, etc.) normally present in surface developers constitute what is commonly referred to as an activator solution. Except for the omission of the developing agent, activator solutions are identical to developer solutions in composition and are employed identically with incorporated developing agent photographic elements. Subsequent references to developing compositions are inclusive of both developer and activator solutions.

The surface developers are alkaline. Conventional activators, preferably in combination with buffers, such as sodium hydroxide, potassium hydroxide, sodium carbonate, potassium carbonate, trisodium phosphate or sodium metaphosphate, can be employed to adjust pH to a desired alkaline level. The amounts of these materials present are selected so as to adjust the developer to a pH in the range of from 10 to 13, preferably from about 10.2 to 12.0.

The developing compositions used in the process of this invention can contain certain antifoggants and development restrainers, or, optionally, they can be incorporated in layers of the photographic element. For example, in some applications, improved results can be obtained when the direct-positive emulsions are processed in the presence of certain antifoggants, as disclosed in Stauffer U.S. Pat. No. 2,497,917, which is incorporated herein by reference.

Typical useful antifoggants include benzotriazoles, such as, benzotriazole, 5-methylbenzotriazole, 5-ethylbenzotriazole, benzimidazoles, such as, 5-nitrobenzimidazole, benzothiazoles, such as, 5-nitrobenzothiazole, 5-methylbenzothiazole, heterocyclic thiones, such as, 1-methyl-2-tetrazoline-5-thione, triazines, such as, 2,4-dimethylamino-6-chloro-5-triazine, benzoxazoles, such as, ethylbenzoxazole, and pyrroles, such as 2,5-dimethylpyrrole.

Improved results are obtained when the element is processed in the presence of the antifoggants mentioned above. The antifoggants can be present in the processing solution during development or incorporated in the photographic element. It is preferred to incorporate the antifoggant in the processing solution. Concentrations of from about 1 mg to 1 gram per liter are contemplated, with concentrations of from about 5 to 500 mg per liter being preferred. Optimum antifoggant concentrations are a function of the specific antifoggant, element, and processing solution employed.

The essential features of the dihydrospiropyran nucleating agents of this invention and the silver halide emulsions and photographic elements in which they are incorporated, as well as procedures for their use and processing, are described above. It is appreciated that, in preferred photographic applications, the emulsions and elements can contain additional features which are in themselves well known to those familiar with the photographic arts. Further, these applications can entail conventional modifications in the procedures described above. A variety of such features are disclosed in *Research Disclosure*, Volume 176, December 1978, Item 17643, the disclosure of which is herein incorporated by reference, particularly Paragraph II, Emulsion washing; Paragraph IV, Spectral sensitization and Desensitization; Paragraph V, Brighteners; Paragraph VI, Antifoggants and stabilizers; Paragraph VIII, Absorbing and scattering materials; Paragraph X, Hardeners; Paragraph XI, Coating aids; Paragraph XII, Plasticizers and lubricants; Paragraph XIII, Antistatic layers; Paragraph XIV, Methods of addition; Paragraph XV, Coating and drying Procedures; Paragraph XVI, Matting agents; Paragraph XVIII, Exposure; Paragraph XIX, Processing (as applied to post-development processing and paragraphs G, H, I, and J, relating to amplification); Paragraph XX, Developing agents; and Paragraph XXI, Development modifiers.

It is specifically contemplated that the dihydrospiropyran nucleating agents of the present invention can be employed in combination with conventional nucleating agents of the quaternary ammonium salt, hydrazine, hydrazide, and hydrazone type, such as those cited above to illustrate known nucleating agents. The conventional nucleating agents can be incorporated in the photographic element in previously taught concentrations, typically up to 2 grams per mole of silver. The conventional nucleating agents can also be present in the developer in previously taught concentrations, typically up to about 5 grams per liter. Since the use of conventional nucleating agents is not essential to the practice of this invention, no minimum concentration is required; however, when employed, conventional nucleating agents are preferably present in a concentration range of from about 10 to 500 mg per mole of silver when present in the emulsion and from about 0.1 to 1 gram per liter when present in the developer.

The silver halide emulsions can be spectrally sensitized with cyanine, merocyanine, and other polymethine dyes and supersensitizing combinations thereof well known in the art. Spectral sensitizers in conventional surface-sensitive emulsions are comparably effective in the emulsions of this invention. In general, they enhance nucleation. Nonionic, zwitterionic and anionic spectral sensitizers are preferred. Particularly effective are carboxy-substituted merocyanine dyes of the thiohydantoin type described by Stauffer et al U.S. Pat. No. 2,490,758.

Effective red sensitizers are the carbocyanines of formula (II)

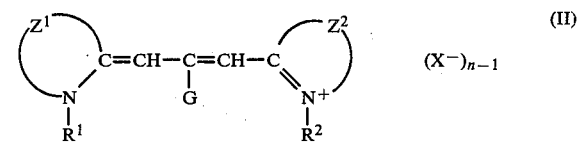

wherein
each of $Z^1$ and $Z^2$ represents the atoms necessary to form a benzothiazole, benzoselenazole, naphthothiazole, or naphthoselenazole, the benzothiazole and benzoselenazole being preferably 5- and/or 6-substituted with groups, such as, lower alkyl, lower alkoxy, chloro, bromo, fluoro, hydroxy, acylamino, cyano, and trifluoromethyl, G represents hydrogen and lower alkyl, preferably ethyl or methyl, each of $R^1$ and $R^2$ represents lower alkyl or hydroxy-(lower)alkyl, at least one of $R^1$ and $R^2$ being preferably acid-substituted(lower)alkyl, such as, carboxyethyl, sulfopropyl, and sulfatoethyl, X represents an acid anion, and n is 1 or 2.

Particularly effective are certain supersensitizing combinations of the above dyes with each other and with dyes or other adsorbed organic compounds having polarographic oxidation potentials ($E_{ox}$) of about 0.3 to 0.9 volt. Many such combinations are described in Mees U.S. Pat. No. 2,075,048, Carroll et al U.S. Pat. Nos.

2,313,922, 2,533,426, 2,688,545, and 2,704,714, Jones U.S. Pat. No. 2,704,717, and Schwan 3,672,898, and include as well as the acid-substituted analogues thereof well known in the art.

Effective green sensitizers are carbocyanines and cyanines of formulas (III) and (IV)

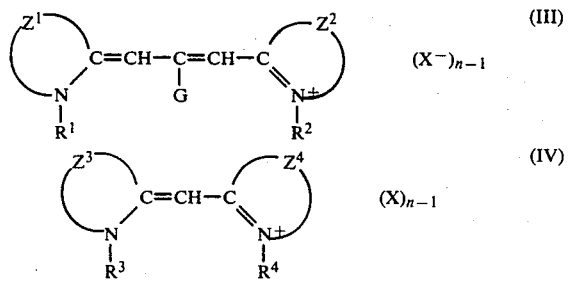

wherein each of $Z^1$ and $Z^2$ represents the atoms necessary to form benzoxazole and benzimidazole nuclei, benzimidazole being substituted in the 3-position by lower alkyl or aryl, and preferably in the 5- and/or 6-positions with groups selected from fluoro, chloro, bromo, lower alkyl, cyano, acylamino and trifluoromethyl, and the benzoxazole ring preferably substituted in the 5- or 6-positions with lower alkyl, lower alkoxy, phenyl, fluoro, chloro, and bromo, $Z^3$ represents the atoms necessary to form benzothiazole, benzoselenazole, naphthothiazole, naphthoselenazole, or 2-quinoline, $Z^4$ represents the atoms necessary to form 2-quinoline, G represents lower alkyl and, if at least one of $Z^1$ and $Z^2$ forms benzimidazole, hydrogen, each of $R^1$, $R^2$, $R^3$ and $R^4$ represents lower alkyl or hydroxy(lower)alkyl, at least one of $R^1$ and $R^2$ and of $R^3$ and $R^4$ being preferably acid-substituted(lower)alkyl, such as, carboxyethyl, sulfopropyl, and sulfatoethyl, X represents an acid anion, and n is 1 or 2.

Particularly effective are certain supersensitizing combinations of the above dyes, such as those described in Carroll et al U.S. Pat. Nos. 2,688,545 and 2,701,198, Nys et al U.S. Pat. No. 2,973,264, and Schwan et al U.S. Pat. No. 3,397,060, and their acid-substituted analogues well known in the art.

Effective blue sensitizers are simple cyanines and merocyanines of formulas (V) and (VI)

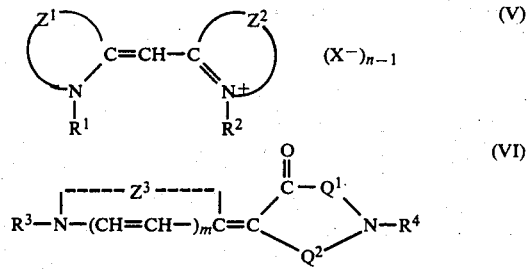

wherein each of $Z^1$ and $Z^2$ represents the atoms necessary to form benzothiazole, benzoselenazole, naphthothiazole and naphthoselenazole nuclei which may be substituted with groups, such as, chloro, methyl or methoxy, chloro, bromo, lower alkyl, or lower alkoxy, $Z^3$ represents benzothiazole, benzoselenazole which may be substituted as in $Z^1$ and $Z^2$, and a pyridine nucleus, $Q^1$ and $Q^2$ together represent the atoms necessary to complete a rhodanine, 2-thio-2,4-oxazolidinedione or 2-thiohydantoin ring, the latter having a second nitrogen atom with a substitutent $R^5$, m represents 0 or 1, each of $R^1$, $R^2$ and $R^3$ represents lower alkyl or hydroxy(lower)alkyl, at least one of $R^1$ and $R^2$ being preferably acid-substituted(lower)alkyl, such as, carboxyethyl, sulfopropyl, and sulfatoethyl, $R^4$ and $R^5$ represent lower alkyl and hydroxy(lower)alkyl, and $R^4$ additionally can represent carboxyalkyl and sulfoalkyl, X is an acid anion, and n is 1 or 2.

(Lower alkyl in each occurrence of Formulas II to VI includes from 1 to 5 carbon atoms.)

The photographic elements are preferably color photographic elements which form dye images through the selective destruction, formation or physical removal of dyes.

The photographic elements can produce dye images through the selective destruction of dyes or dye precursors, such as silver-dye-bleach processes, as illustrated by A. Meyer, *The Journal of Photographic Science*, Volume 13, 1965, pages 90 through 97. Bleachable azo, azoxy, xanthene, azine, phenylmethane, nitroso complex, indigo, quinone, nitro-substituted, phthalocyanine, and formazan dyes, as illustrated by Stauner et al U.S. Pat. No. 3,754,923, Piller et al U.S. Pat. No. 3,749,576, Yoshida et al U.S. Pat. No. 3,738,839, Forelich et al U.S. Pat. No. 3,716,368, Piller U.S. Pat. No. 3,655,388, Williams et al U.S. Pat. No. 3,642,482, Gilman U.S. Pat. No. 3,567,448, Loeffel U.S. Pat. No. 3,443,953, Anderau U.S. Pat. Nos. 3,443,952 and 3,211,556, Mory et al U.S. Pat. Nos. 3,202,511 and 3,178,291, and Anderau et al. U.S. Pat. Nos. 3,178,285 and 3,178,290 as well as their hydrazo, diazonium, and tetrazolium precursors and leuco and shifted derivatives, as illustrated by U.K. Pat. Nos. 923,265, 999,996, and 1,042,300, Pelz et al U.S. Pat. No. 3,684,513, Watanabe et al U.S. Pat. No. 3,615,493, Wilson et al U.S. Pat. No. 3,503,741, Boes et al U.S. Pat. No. 3,340,059, Gompf et al U.S. Pat. No. 3,493,372, and Puschel et al U.S. Pat No. 3,561,970 can be employed.

The photographic elements can produce dye images through the selective formation of dyes, such as by reacting (coupling) a color-developing agent (e.g., a primary aromatic amine) in its oxidized form with a dye-forming coupler. The dye-forming couplers can be incorporated in the photographic elements, as illustrated by Schneider et al, *Die Chemie*, Volume 57, 1944, page 113, Mannes et al U.S. Pat. No. 2,304,940, Martinez U.S. Pat. No. 2,269,158, Jelley et al U.S. Pat. No. 2,322,027, Frolich et al U.S. Pat. No. 2,376,679, Fierke et al U.S. Pat. No. 2,801,171, Smith U.S. Pat. No. 3,748,141, Tong U.S. Pat. No. 2,772,163, Thirtle et al U.S. Pat. No. 2,835,579, Sawdey et al U.S. Pat. No. 2,533,514, Peterson U.S. Pat. No. 2,353,754, Seidel U.S. Pat. No. 3,409,435, and Chen *Research Disclosure*, Volume 159, July 1977, Item 15930.

In one form, the dye-forming couplers are chosen to form subtractive primary (i.e., yellow, magenta, and cyan) image dyes and are nondiffusible, colorless couplers, such as, two- and four-equivalent couplers of the open chain ketomethylene, pyrazolone, pyrazolotriazole, pyrazolobenzimidazole, phenol, and naphthol type hydrophobically ballasted for incorporation in high-boiling organic (coupler) solvents. Such couplers are illustrated by Salminen et al U.S. Pat. Nos. 2,423,730, 2,772,162, 2,895,826, 2,710,803, 2,407,207, 3,737,316, and 2,367,531, Loria et al U.S. Pat. Nos. 2,772,161, 2,600,788, 3,006,759, 3,214,437, and 3,253,924, McCrossen et al U.S. Pat. No. 2,875,057, Bush et al U.S. Pat. No. 2,908,573, Gledhill et al U.S. Pat. No. 3,034,892, Weissberger et al U.S. Pat. Nos. 2,474,293, 2,407,210, 3,062,653, 3,265,506, and 3,384,657, Porter et al U.S. Pat. No. 2,343,703, Greenhalgh et al U.S. Pat. No. 3,127,269, Feniak et al U.S. Pat. Nos. 2,865,748, 2,933,391, and 2,865,751, Bailey et al U.S. Pat. No. 3,725,067, Beavers et al U.S. Pat. No. 3,758,308, Lau U.S. Pat. No. 3,779,763, Fernandez U.S. Pat. No. 3,785,829, U.K. Pat. No. 969,921, U.K. Pat. No. 1,241,069, U.K. Pat. No. 1,011,940, Vanden Eynde et al U.S. Pat. No. 3,762,921, Beavers U.S. Pat. No. 2,983,608, Loria U.S. Pat. Nos. 3,311,476, 3,408,194, 3,458,315, 3,447,928, and 3,476,563, Cressman et al U.S. Pat. No. 3,419,390, Young U.S. Pat. No. 3,419,391, Lestina U.S. Pat. No. 3,519,429, U.K. Pat. No. 975,928, U.K. Pat. No. 1,111,554, Jaeken U.S. Pat. No. 3,222,176 and Canadian Pat. No. 726,651, Schulte et al U.K. Pat. No. 1,248,924, and Whitmore et al U.S. Pat. No. 3,227,550.

The photographic elements can incorporate alkali-soluble ballasted couplers, as illustrated by Froelich et al and Tong, cited above. The photographic elements can be adapted to form nondiffusible image dyes using dye-forming couplers in developers, as illustrated by U.K. Pat. No. 478,984, Yager et al U.S. Pat. No. 3,113,864, Vittum et al U.S. Pat. Nos. 3,002,836, 2,271,238, and 2,362,598, Schwan et al U.S. Pat. No. 2,950,970, Carroll et al U.S. Pat. No. 2,592,243, Porter et al U.S. Pat. Nos. 2,343,703, 2,376,380, and 2,369,489, Spath U.K. Pat. No. 886,723 and U.S. Pat. No. 2,899,306, Tuite U.S. Pat. No. 3,152,896, and Mannes et al U.S. Pat. Nos. 2,115,394, 2,252,718, and 2,108,602.

The dye-forming couplers upon coupling can release photographically useful fragments, such as, development inhibitors or accelerators, bleach accelerators, developing agents, silver halide solvents, toners, hardeners, fogging agents, antifoggants, competing couplers, chemical or spectral sensitizers, and desensitizers. Development inhibitor-releasing (DIR) couplers are illustrated by Whitmore et al U.S. Pat. No. 3,148,062, Barr et al U.S. Pat. No. 3,227,554, Barr U.S. Pat. No. 3,733,201, Sawdey U.S. Pat. No. 3,617,291, Groet et al U.S. Pat. No. 3,703,375, Abbott et al U.S. Pat. No. 3,615,506, Weissberger et al U.S. Pat. No. 3,265,506, Seymour U.S. Pat. No. 3,620,745, Marx et et al U.S. Pat. No. 3,632,345, Mader et al U.S. Pat. No. 3,869,291, U.K. Pat. No. 1,201,110, Oishi et al U.S. Pat. No. 3,642,485, Verbrugghe U.K. Pat. No. 1,236,767, Fujiwhara et al U.S. Pat. No. 3,770,436, and Matsuo et al U.S. Pat. No. 3,808,945. DIR compounds which do not form dye upon reaction with oxidized color-developing agents can be employed, as illustrated by Fujiwhara et al German OLS No. 2,529,350 and U.S. Pat. Nos. 3,928,041, 3,958,993, and 3,961,959, Odenwalder et al German OLS No. 2,448,063, Tanaka et al German OLS No. 2,610,546, Kikuchi et al U.S. Pat. No. 4,049,455, and Credner et al U.S. Pat. No. 4,052,213. DIR compounds which oxidatively cleave can be employed, as illustrated by Porter et al U.S. Pat. No. 3,379,529, Green et al U.S. Pat. No. 3,043,690, Barr U.S. Pat. No. 3,364,022, Duennebier et al U.S. Pat. No. 3,297,445, and Rees et al U.S. Pat. No. 3,287,129.

The photographic elements can incorporate colored dye-forming couplers, such as those employed to form integral masks for negative color images, as illustrated by Hanson U.S. Pat. No. 2,449,966, Glass et al U.S. Pat. No. 2,521,908, Gledhill et al U.S. Pat. No. 3,034,892, Loria U.S. Pat. No. 3,476,563, Lestina U.S. Pat. No. 3,519,429, Friedman U.S. Pat. No. 2,543,691, Puschel et al U.S. Pat. No. 3,028,238, Menzel et al U.S. Pat. No. 3,061,432, and Greenhalgh U.K. Pat. No. 1,035,959, and/or competing couplers, as illustrated by Murin et al U.S. Pat. No. 3,876,428, Sakamoto et al U.S. Pat. No. 3,580,722, Puschel U.S. Pat. No. 2,998,314, Whitmore U.S. Pat. No. 2,808,329, Salminen U.S. Pat. No. 2,742,832, and Weller et al U.S. Pat. No. 2,689,793.

The photographic elements can produce dye images through the selective removal of dyes. Negative or positive dye images can be produced by the immobilization of incorporated color-providing substances as a function of exposure and development, as illustrated by U.K. Pat. Nos. 1,456,413, 1,479,739, 1,475,265, and 1,471,752, Friedman U.S. Pat. No. 2,543,691, Whitmore U.S. Pat. No. 3,227,552, Bloom et al U.S. Pat. No. 3,443,940, Morse U.S. Pat. No. 3,549,364, Cook U.S. Pat. No. 3,620,730, Danhauser U.S. Pat. No. 3,730,718, Staples U.S. Pat. No. 3,923,510, Oishi et al U.S. Pat. No. 4,052,214, and Fleckenstein et al U.S. Pat. No. 4,076,529.

The photographic elements can contain antistain agents (i.e., oxidized developing agent scavengers) to prevent developing agents oxidized in one dye image layer unit from migrating to an adjacent dye image layer unit. Such antistain agents include ballasted or otherwise nondiffusing antioxidants, as illustrated by Weissberger et al U.S. Pat. No. 2,336,327, Loria et al U.S. Pat. No. 2,728,659, Vittum et al U.S. Pat. No. 2,360,290, Jelley et al U.S. Pat. No. 2,403,721, and Thirtle et al U.S. Pat. No. 2,701,197. To avoid autooxidation the antistain agents can be employed in combination with other antioxidants, as illustrated by Knechel et al U.S. Pat. No. 3,700,453.

The photographic elements can include image dye stabilizers. Such image dye stabilizers are illustrated by U.K. Pat. No. 1,326,889, Lestina et al U.S. Pat. Nos. 3,432,300 and 3,698,909, Stern et al U.S. Pat. No. 3,574,627, Brannock et al U.S. Pat. No. 3,573,050, Arai et al U.S. Pat. No. 3,764,337, and Smith et al U.S. Pat. No. 4,042,394.

This invention is particularly useful with photographic elements used in image transfer processes or in image transfer film units.

Image transfer systems include colloid transfer systems, as illustrated by Yutzy et al U.S. Pat. Nos. 2,596,756 and 2,716,059, silver salt diffusion transfer systems, as illustrated by Rott U.S. Pat. No. 2,352,014, Land U.S. Pat. No. 2,543,181, Yackel et al U.S. Pat. No. 3,020,155, and Land U.S. Pat. No. 2,861,885, imbibition transfer systems, as illustrated by Minsk U.S. Pat. No. 2,882,156, and color image transfer systems, as illustrated by *Research Disclosure,* Volume 151, November 1976, Item 15162, and Volume 123, July 1974, Item 12331.

Color image transfer systems (including emulsion layers, receiving layers, timing layers, acid layers, processing compositions, supports, and cover sheets) and the images they produce can be varied by choosing among a variety of features, combinations of which can be used together as desired.

Film units can be chosen which are either integrally laminated or separated during exposure, processing and/or viewing, as illustrated by Rogers U.S. Pat. No. 2,983,606, Beavers et al U.S. Pat. No. 3,445,228, Whitmore Canadian Pat. No. 674,082, Friedman et al U.S. Pat. No. 3,309,201, Land U.S. Pat. Nos. 2,543,181, 3,053,659, 3,415,644, 3,415,645, and 3,415,646, and Barr et al U.K. Pat. No. 1,330,524.

A variety of approaches are known in the art for obtaining transferred dye images. The approaches can be generally categorized in terms of the initial mobility of dye or dye precursor. (Initial mobility refers to the mobility of the dye or dye precursor when it is contacted by the processing solution. Initially mobile dyes and dye precursors as coated do not migrate prior to contact with processing solution.)

Dye image-providing compounds are classified as either positive-working or negative-working. Positive-working dye image-providing compounds are those which produce a positive transferred dye image when employed in combination with a conventional, negative-working silver halide emulsion. Negative-working dye image-providing compounds are those which produce a negative transferred dye image when employed in combination with conventional, negative-working silver halide emulsions. (The foregoing techniques, such as those referred to in *Research Disclosure,* Vol. 176, December 1978, Item 17643, paragraph XXIII-E.) When, as in the present invention, the silver halide emulsions are direct-positive emulsions, positive-working dye image-providing compounds produce negative transferred dye images and negative-working dye image-providing compounds produce positive transferred dye images.

Image transfer systems, which include both the dye image-providing compounds and the silver halide emulsions, are positive-working when the transferred dye image is positive and negative-working when the transferred dye image is negative. When a retained dye image is formed, it is opposite in sense to the transferred dye image.

A variety of dye image transfer systems have been developed and can be employed in the practice of this invention. One approach is to employ ballasted dye-forming (chromogenic) or nondye-forming (non-chromogenic) couplers having a mobile dye attached at a coupling-off site. Upon coupling with an oxidized color developing agent, such as a para-phenylenediamine, the mobile dye is displaced so that it can transfer to a receiver. This negative-working image transfer approach is illustrated by Whitmore et al U.S. Pat. No. 3,227,550, Whitmore U.S. Pat. No. 3,227,552, and Fujihara et al U.K. Pat. No. 1,445,797, the disclosures of which are here incorporated by reference.

In a preferred image transfer system according to this invention employing negative-working dye image-providing compounds, a cross-oxidizing developing agent (electron transfer agent) develops silver halide and then cross-oxidizes with a compound containing a dye linked through an oxidizable sulfonamido group, such as a sulfonamidophenol, sulfonamidoaniline, sulfonamidoanilide, sulfonamidopyrazolobenzimidazole, sulfonamidoindole or sulfonamidopyrazole. Following cross-oxidation, nydrolytic deamidation cleaves the mobile dye with the sulfonamido group attached. Such systems are illustrated by Fleckenstein U.S. Pat. Nos. 3,928,312 and 4,053,312, Fleckenstein et al U.S. Pat. No. 4,076,529, Melzer et al U.K. Pat. No. 1,489,694, Deguchi German OLS No. 2,729,820, Koyama et al German OLS No. 2,613,005, Vetter et al German OLS No. 2,505,248, and Kestner et al *Research Disclosure,* Volume 151, November 1976, Item 15157. Also specifically contemplated are otherwise similar systems which employ an immobile, dye-releasing (a) hydroquinone, as illustrated by Gompf et al U.S. Pat. No. 3,698,897 and Anderson et al U.S. Pat. No. 3,725,062, (b) para-phenylenediamine, as illustrated by Whitmore et al Canadian Pat. No. 602,607, or (c) quaternary ammonium compound, as illustrated by Becker et al U.S. Pat. No. 3,728,113.

Another specifically contemplated dye image transfer system which is negative-working reacts an oxidized electron transfer agent or, specifically, in certain forms, an oxidized para-phenylenediamine with a ballasted phenolic coupler having a dye attached through a sulfonamide linkage. Ring closure to form a phenazine releases mobile dye. Such an imaging approach is illustrated by Bloom et al U.S. Pat. Nos. 3,443,939 and 3,443,940.

In still another negative-working system, ballasted sulfonylamidrazones, sulfonylhydrazones or sulfonylcarbonylhydrazides can be reacted with oxidized para-phenylenediamine to release a mobile dye to be transferred, as illustrated by Puschel et al U.S. Pat. Nos. 3,628,952 and 3,844,785. In an additional negative-working system, a hydrazide can be reacted with silver halide having a developable latent image site and thereafter decompose to release a mobile, transferable dye, as illustrated by Rogers U.S. Pat. Nos. 3,245,789, Kohara et al, *Bulletin Chemical Society of Japan,* Volume 43, pages 2433 through 2437, and Lestina et al *Research Disclosure,* Volume 28, December 1974, Item 12832.

Image transfer systems employing negative-working image dye-providing compounds are also known in which dyes are not initially present, but are formed by reactions occurring in the photographic element or receiver following exposure. For example, a ballasted coupler can react with color developing agent to form a mobile dye, as illustrated by Whitmore et al U.S. Pat. No. 3,227,550, Whitmore U.S. Pat. No. 3,227,552, Bush et al U.S. Pat. No. 3,791,827, and Viro et al U.S. Pat. No. 4,036,643. An immobile compound containing a coupler can react with oxidized para-phenylenediamine to release a mobile coupler which can react with additional oxidized para-phenylenediamine before, during or after release to form a mobile dye, as illustrated by Figueras et al U.S. Pat. No. 3,734,726 and Janssens et al German OLS No. 2,317,134. In another form, a ballasted amidrazone reacts with an electron transfer agent as a function of silver halide development to release a mobile amidrazone which reacts with a coupler to form a dye at the receiver, as illustrated by Ohyama et al U.S. Pat. No. 3,933,493.

An image to be viewed can be transferred from the image-forming layers. A retained image can be formed for viewing as a concurrently formed complement of the transferred image. Positive transferred images and useful negative retained images can be formed with the direct-positive silver halide emulsions of this invention when imaging chemistry is negative-working. Images retained in and transferred from the image-forming layers are illustrated by U.K. Pat. No. 1,456,413, Friedman U.S. Pat. No. 2,543,691, Bloom et al U.S. Pat. No.

3,443,940, Staples U.S. Pat. No. 3,923,510, and Fleckenstein et al U.S. Pat. No. 4,076,529.

Where mobile dyes are transferred to the receiver a mordant is commonly present in a image dye-providing layer. Mordants and mordant containing layers are described in the following references which are incorporated by reference: Sprague et al U.S. Pat. No. 2,548,564, Weyerts U.S. Pat. No. 2,548,575, Carroll et al U.S. Pat. No. 2,675,316, Yutzy et al U.S. Pat. No. 2,713,305, Saunders et al U.S. Pat. No. 2,756,149, Reynolds et al U.S. Pat. No. 2,768,078, Gray et al U.S. Pat. No. 2,839,401, Minsk U.S. Pat. Nos. 2,882,156 and 2,945,006, Whitmore et al U.S. Pat. No. 2,940,849, Condax U.S. Pat. No. 2,952,566, Mader et al U.S. Pat. No. 3,016,306, Minsk et al U.S. Pat. Nos. 3,048,487 and 3,184,309, Bush U.S. Pat. No. 3,271,147, Whitmore U.S. Pat. No. 3,271,148, Jones et al U.S. Pat. No. 3,282,699, Wolf et al U.S. Pat. No. 3,408,193, Cohen et al U.S. Pat. Nos. 3,488,706, 3,557,066, 3,625,694, 3,709,690, 3,758,445, 3,788,855, 3,898,088, and 3,944,424, Cohen U.S. Pat. No. 3,639,357, Taylor U.S. Pat. No. 3,770,439, Campbell et al U.S. Pat. Nos. 3,958,995 and 4,193,795; and Ponticello et al *Research Disclosure*, Vol. 120, April 1974, Item 12045.

One-step processing can be employed, as illustrated by U.K. Pat. No. 1,471,752, Land U.S. Pat. No. 2,543,181, Rogers U.S. Pat. No. 2,983,606 (pod processing), Land U.S. Pat. No. 3,485,628 (soak image-former and laminate to receiver) and Land U.S. Pat. No. 3,907,563 (soak receiver and laminate to image-forming element) or multi-step processing can be employed, as illustrated by Yutzy U.S. Pat. No. 2,756,142, Whitmore et al U.S. Pat. No. 3,227,550, and Faul et al U.S. Pat. No. 3,998,637.

Preformed reflective layers can be employed, as illustrated by Whitmore Canadian Pat. No. 674,082, Beavers U.S. Pat. No. 3,445,228, Land U.S. Pat. Nos. 2,543,181, 3,415,644, '645 and '646, and Barr et al U.K. Pat. No. 1,330,524 or processing-formed reflective layers can be employed, as illustrated by Land U.S. Pat. Nos. 2,607,685 and 3,647,437, Rogers U.S. Pat. No. 2,983,606, and Buckler U.S. Pat. No. 3,661,585.

Generally, the image transfer film units in accordance with this invention comprise:

(1) a photographic element comprising a support having thereon at least one silver halide emulsion layer containing radiation-sensitive internal latent image silver halide grains and a dihydrospiropyran nucleating agent, the emulsion layer preferably having in contact therewith an image dye-providing material, (2) an image-receiving layer, which can be located on a separate support and superposed or adapted to be superposed on the photographic element or, preferably, can be coated as a layer in the photographic element, (3) an alkaline processing composition, (4) means containing and adapted to release the alkaline processing composition into contact with the emulsion layer, and (5) a silver halide developing agent located in at least one of the photographic element and alkaline processing composition so that the processing composition and developing agent, when brought together, form a silver halide surface developer.

In highly preferred embodiments, the film units of this invention contain a support having thereon a layer containing a blue-sensitive emulsion and in contact therewith a yellow image dye-providing material, a red-sensitive silver halide emulsion and in contact therewith a cyan image dye-providing material, and a green-sensitive emulsion and in contact therewith a magenta image dye-providing material, and preferably all of said image dye-providing materials are initially immobile image dye-providing materials.

The terms "diffusible" (or "mobile") and "immobile" (or "nondiffusible"), as used herein, refer to compounds which are incorporated in the photographic element and, upon contact with an alkaline processing solution, are substantially diffusible or substantially immobile, respectively, in the hydrophilic colloid layers of a photographic element.

The term "image dye-providing material", as used herein, is understood to refer to those compounds which are employed to form dye images in photographic elements. These compounds include dye developers, shifted dyes, color couplers, oxichromic compounds, dye redox releasers, etc., as described above in connection with positive-working and negative-working image transfer systems.

In one preferred embodiment, the receiver layer is coated on the same support with the photosensitive silver halide emulsion layers, the support is preferably a transparent support, an opaque layer is preferably positioned between the image-receiving layer and the photosensitive silver halide layer, and the alkaline processing composition preferably contains an opacifying substance, such as carbon or a pH-indicator dye which is discharged into the film unit between a dimensionally stable support or cover sheet and the photosensitive element.

In certain embodiments, the cover sheet can be superposed or is adapted to be superposed on the photosensitive element. The image-receiving layer can be located on the cover sheet so that it becomes an image-receiving element. In certain preferred embodiments where the image-receiving layer is located in the photosensitive element, a neutralizing layer is located on the cover sheet.

Increases in maximum density can be obtained in color image transfer film units containing internally sulfur and gold-sensitized emulsions of the type described by Evans U.S. Pat. No. 3,761,276, and sulfonamidonaphthol redox dye-releasing compounds of the type described by Fleckenstein British Pat. No. 1,405,662, by incorporation into the emulsion layers of a variety of chemical addenda generally recognized in the art as antifoggants or development inhibitors, as well as hydrolyzable precursors thereof. Many of these compounds also provide improved stabilization of sensitometric properties of liquid emulsion and of the storage life of the coated emulsion. The effects, shown in film units of the type described in Examples 40 through 42 of British Pat. No. 1,405,662, are in addition to the effect of 5-methylbenzotriazole in the processing composition even when the latter is present in quantities as high as 4 grams per liter. Effective compounds in general are selected from the group consisting of (a) 1,2,3-triazoles, tetrazoles and benzotriazoles having an N-$R^1$ group in the heterocyclic ring, wherein $R^1$ represents hydrogen or an alkali-hydrolyzable group, or (b) heterocyclic mercaptans or thiones and precursors thereof, mostly having one of the formulas (VII) or (VIII):

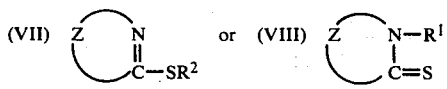

wherein

Z comprises the atoms necessary to complete an azole ring, and $R^2$ represents, in addition to the groups specified above for $R^1$, a metal ion.

The compounds are generally employed at concentrations less than about 300 mg per mole of silver, each compound having an optimum concentration above which development and/or nucleation are inhibited and $D_{max}$ decreases with increasing concentration. Specifically preferred antifoggants and stabilizers, as well as other preferred color image transfer film unit and system features, are more specifically disclosed in *Research Disclosure*, Volume 151, November 1976, Item 15162, the disclosure of which is hereby incorporated by reference.

A more detailed description of useful image transfer film units and systems is contained in the patents relating to image transfer cited above, the disclosures of which are here incorporated by reference. A specific preferred image-transfer film unit and image transfer system is that disclosed by Leone et al U.S. Pat. No. 4,030,925, cited above, and here incorporated by reference.

In a specific preferred form the photographic elements of this invention are intended to produce multicolor images which can be viewed in the elements or in a receiver when the elements form a part of a multicolor image transfer system. For multicolor imaging at least three superimposed color-forming layer units are coated on a support. Each of the layer units is comprised of at least one silver halide emulsion layer. At least one of the silver halide emulsion layers, preferably at least one of the silver halide emulsion layers in each color-forming layer unit and most preferably each of the silver halide emulsion layers, contain an emulsion according to this invention substantially as described above. The emulsion layers of one of the layer units are primarily responsive to the blue region of the spectrum, the emulsion layers of a second of the layer units are primarily responsive to the green region of the spectrum, and the emulsion layers of a third of the layer units are primarily responsive to the red region of the spectrum. The layer units can be coated in any conventional order. In a preferred layer arrangement the red responsive layer unit is coated nearest the support and is overcoated by the green responsive layer unit, a yellow filter layer and a blue responsive layer unit. The layer units each contain in the emulsion layers or in adjacent hydrophilic colloid layers at least one dye image-providing compound. Such compounds can be selected from among those described above. Incorporated dye-forming couplers and redox dye-releasers constitute exemplary preferred image dye-providing compounds. The blue, green and red responsive layer units preferably contain yellow, magenta and cyan image dye providing compounds, respectively.

The preparation of exemplary specific preferred dihydrospiropyrans is set forth below:

COMPOUND 1

3,4-Dihydro-3'-methyl-4-(3-methyl-2-benzothiazolinylidenemethyl)spiro[2H-1-benzopyran-2,2'-benzothiazoline]

40.2 g of 2,3-dimethylbenzothiazolium tosylate and 7.32 g of salicylic aldehyde were mixed in 1200 ml of ethanol; to this mixture were added 12 ml of piperidine with stirring. Stirring was continued for 1 hour at room temperature. A precipitate was formed which was filtered out and washed with ethanol.

17 g of a slightly colored substance were collected (m.p. 168° C., yield: 65%).

COMPOUND 2

3,4-Dihydro-8-methoxy-3'-methyl-4-(3-methyl-2-benzothiazolinylidenemethyl)spiro[2H-1-benzopyran-2,2'-benzothiazoline]

20.1 g of 2,3-dimethylbenzothiazolium tosylate and 4.56 g of ortho-vanillin were mixed in 600 ml of ethanol; to this mixture were added 6 ml of piperidine with stirring. Stirring was continued for 2 hours at room temperature. A precipitate was formed which was filtered out, washed with ethanol and dried. 11 g of colored substance were obtained (yield: 87%).

COMPOUND 3

3,4-Dihydro-1',3',3'-trimethyl-4-(1,3,3-trimethylindolinylidenemethyl)spiro[2H-1-benzopyran-2,2'-indoline]

A solution of 6.92 g of 1,3,3-trimethyl-2-methyleneindolenine and 2.44 g of salicylic aldehyde in 30 ml of methanol was prepared; this solution was refluxed in a nitrogen atmosphere for 15 minutes. A precipitate was formed which was washed with the minimum amount of methanol and ethyl ether, then was recrystallized from acetone. A white product was obtained (m.p. 205° C., yield: 77%).

COMPOUND 4

3,4-Dihydro-8-methoxy-1',3',3'-trimethyl-4-(1,3,3-trimethylindolinylidenemethyl)spiro[2H-1-benzopyran-2,2'-indoline]

A solution of 6.92 g of 1,3,3-trimethyl-2-methyleneindolenine and 3.04 g of orthovanillin in 30 ml of methanol was prepared. It was refluxed for 10 minutes in a nitrogen atmosphere. A precipitate was formed which was filtered out and washed with ethyl ether. 6.7 g of a white product were obtained (m.p. 201° C., yield: 70%).

The following examples illustrate the use of dihydrospiropyrans as nucleating agents for internal latent image direct-positive silver halide emulsions.

EXAMPLES

A gelatino-silver bromide emulsion capable of forming an internal latent image of the type disclosed in Evans U.S. Pat. No. 3,761,276 was employed. The emulsion was internally sulfur and gold sensitized and surface sulfur and gold sensitized to a lesser extent to provide a high ratio of internal to surface chemical sensitization. The emulsion contained cubic silver bromide grains having an average diameter of 0.6 micron. (The average grain diameter is the diameter of a circle equal in area to the mean projected area of the silver halide grains.)

To various samples of the emulsion were added dihydrospiropyran in a concentration of $10^{-3}$ mole per mole of silver bromide. To provide a control no dihydrospiropyran was added to one sample of the emulsion.

Each emulsion sample was coated on a polyethylene-coated paper support, at a coverage of 5 mg/dm² of silver and 27.5 mg/dm² of the yellow dye-forming coupler α-pivalyl-α-[4-(4-benzyloxyphenylsulfonyl)-phenoxy]-2-chloro-5-[γ-(2,4-di-tert-amylphenoxy)-butyramido]acetanilide.

A gelatin layer containing 7 mg of gelatin per square decimeter was then coated over each emulsion layer.

The thusly prepared sensitive elements were then exposed in a sensitometer fitted with a light source having a temperature of 2850° K. For each element, a sample was developed for 4 minutes at 38° C. in Developer A below, which is a surface developer.

| Developer A | |
|---|---|
| Benzyl alcohol | 16 ml |
| N-ethyl-n-methylsulfonamido-ethyl-2-methyl-para-phenylenediamine sesqui-sulfate | 6 g |
| Piperidino hexose reductone | 0.5 g |
| Sodium sulfite | 1.5 g |
| Potassium carbonate | 30 g |
| Benzotriazole | 10 mg |
| Water to make | 1 liter |
| pH = 10.5 | |

Processing was finished as follows:

| Stop bath | 20 seconds |
|---|---|
| Bleach-fixing | 1 minute |
| Washing | 2 minutes. |

In all cases in which a dihydrospiropyran was present a yellow positive image having the following characteristics was obtained:

| Nucleated Agent | $D_{min}$ | $D_{max}$ |
|---|---|---|
| Compound 1 | 0.12 | 2.10 |
| Compound 2 | 0.28 | 1.80 |
| Compound 3 | 0.10 | 1.80 |
| Compound 4 | 0.10 | 2.10 |

In the control sample lacking a dihydrospiropyran nucleating agent, substantially no positive image was discernible at the end of 4 minutes, but after 12 minutes a positive image was visible. Thus, the nucleating agents of the present invention are capable of significantly accelerating the formation of a positive image.

The invention has been described with particular reference to preferred embodiments thereof but it will be understood that modifications can be effected within the spirit and scope of the invention.

What is claimed is:

1. A silver halide emulsion comprised of silver halide grains capable of forming an internal latent image and, adsorbed to the surface of said silver halide grains, a nucleating amount of a dihydrospiropyran bis-condensation product of a salicylic aldehyde and at least one heterocyclic ammonium salt.

2. A silver halide emulsion comprised of silver halide grains capable of forming an internal latent image and, adsorbed to the surface of said silver halide grains, a nucleating amount of a dihydrospiropyran of the formula

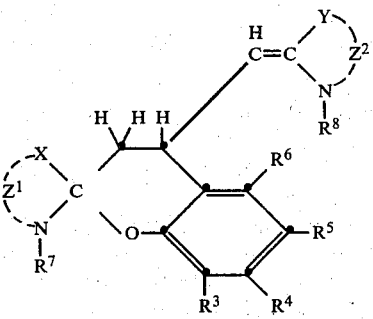

wherein
X and Y each independently represent a sulfur atom, a selenium atom, or a $-C(R^1R^2)-$ radical,
$R^1$ and $R^2$ independently represent lower alkyl of from 1 to 5 carbon atoms or together represent an alkylene radical of 4 or 5 carbon atoms,
$R^3$, $R^4$, $R^5$, and $R^6$ each represent hydrogen, a hydroxy radical, or a lower alkyl or alkoxy radical of from 1 to 5 carbon atoms,
$Z^1$ and $Z^2$ each represent the nonmetallic atoms completing a nitrogen-containing heterocyclic nucleus of the type found in cyanine dyes, and
$R^7$ and $R^8$ each represent a ring nitrogen substituent of the type found in cyanine dyes.

3. A silver halide emulsion according to claim 2 wherein said dihydrospiropyran is present in a concentration of from $10^{-4}$ to $10^{-2}$ mole per mole of silver halide.

4. A silver halide emulsion according to claim 1, 2, or 3 wherein said silver halide grains are predominantly silver bromide and contain metal dopants occluded therein, which grains when coated on a photographic support, exposed to a light intensity scale, and developed for 5 minutes at 25° C. in test surface developer provide (a) a density of less than 0.4 and (b) a density of at least 0.5 less than when this testing procedure is repeated modifying the test surface developer by the inclusion of 0.5 gram per liter of potassium iodide, the test surface developer being of the following composition:

| Water | 500.0 cc |
|---|---|
| N-methyl-p-aminophenol sulfate | 2.5 g |
| Sodium sulfite, desiccated | 30.0 g |
| Hydroquinone | 2.5 g |
| Sodium metaborate | 10.0 g |
| Potassium bromide | 0.5 g |
| Water to make | 1.0 liter. |

5. A silver halide emulsion according to claim 4 wherein $Z^1$ and $Z^2$ are chosen to complete a heterocyclic nucleus chosen from the class consisting of thiazole, benzothiazole, naphthonthiazole, selenazole, benzoselenazole, naphthoselenazole, and indolenine.

6. A silver halide emulsion according to claim 4 wherein $R^7$ and $R^8$ each represent a ring nitrogen alkyl substituent of the type found in cyanine dyes.

7. In a photographic element comprised of a support and a silver halide emulsion layer comprised of silver halide grains capable of forming an internal latent image and, adsorbed to the surface of said silver halide grains, a nucleating agent, the improvement comprising
said nucleating agent being a dihydrospiropyran bis-condensation product of salicylic aldehyde and at least one heterocyclic ammonium salt.

8. In a photographic element capable of forming direct-reversal photographic images comprised of a support and at least one color-forming layer unit comprised of a silver halide emulsion layer containing silver halide grains capable of forming an internal latent image and, adsorbed to the surface of said silver halide grains, a nucleating agent,
the improvement comprising
said nucleating agent being a dihydrospiropyran of the formula

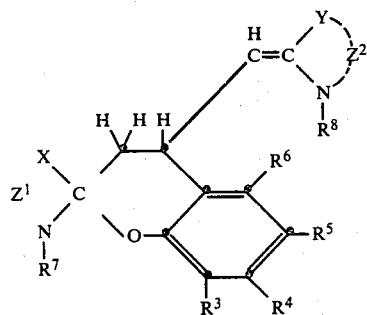

wherein
X and Y each independently represent a sulfur atom, a selenium atom, or a —C(R$^1$R$^2$)— radical, R$^1$ and R$^2$ independently represent lower alkyl of from 1 to 5 carbon atoms or together represent an alkylene radical of 4 or 5 carbon atoms, R$^3$, R$^4$, R$^5$, and R$^6$ each represent hydrogen, a hydroxy radical, or a lower alkyl or alkoxy radical of from 1 to 5 carbon atoms, Z$^1$ and Z$^2$ each represents the nonmetallic atoms completing a nitrogen-containing heterocyclic nucleus of the type found in cyanine dyes, and R$^7$ and R$^8$ each represent a ring nitrogen substituent of the type found in cyanine dyes.

9. In a direct-reversal photographic element according to claim 8 the further improvement in which said dihydrospiropyran is of the formula

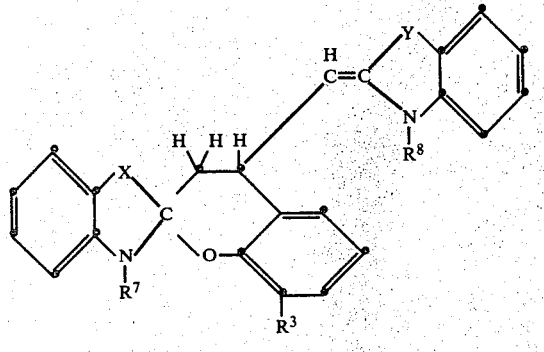

wherein
X and Y each independently represent a sulfur atom, a selenium atom, or a —C(R$^1$R$^2$)— radical, R$^1$ and R$^2$ independently represent lower alkyl of from 1 to 5 carbon atoms or together represent an alkylene radical of 4 or 5 carbon atoms, R$^3$ represents hydrogen, a hydroxy radical, or a lower alkyl or alkoxy radical of from 1 to 5 carbon atoms, and R$^7$ and R$^8$ each represents an alkyl substituent of from 1 to 5 carbon atoms.

10. In a photographic element according to claim 9 the further improvement in which X and Y are both sulfur.

11. In a photographic element according to claim 10 the further improvement in which said dihydrospiropyran is 3,4-dihydro-3'-methyl-4-(3-methyl-2-benzothiazolinylidenemethyl)spiro[2H-1-benzopyran-2,2'-benzothiazoline] or 3,4-dihydro-8-methoxy-3'-methyl-4-(3-methyl-2-benzothiazolinylidenemethyl)spiro[2H-1-benzopyran-2,2'-benzothiazoline].

12. In a photographic element according to claim 9 the further improvement in which X and Y are both —C(R$^1$R$^2$)—.

13. In a photographic element according to claim 12 the further improvement in which said dihydrospiropyran is 3,4-dihydro-1',3',3'-trimethyl-4-(1,3,3-trimethylindolinylidenemethyl)spiro[2H-1-benzopyran-2,2'-indoline] or 3,4-dihydro-8-methoxy-1',3',3'-trimethyl-4-(1,3,3-trimethylindolinylidenemethyl)spiro[2H-1-benzopyran-2,2'-indoline].

14. In a photographic element according to claim 7, 8, 9, 10, 11, 12 or 13 the further improvement wherein said silver halide grains are predominantly silver bromide and contain metal dopants occluded therein, which grains when coated on a photographic support, exposed to a light intensity scale, and developed for 5 minutes at 25° C. in test surface developer provide (a) a density of less than 0.25 and (b) a density of at least 5 times greater when this testing procedure is repeated modifying the test surface developer by the inclusion of 0.5 gram per liter of potassium iodide, the test surface developer being of the following composition:

| | |
|---|---|
| Water | 500.0 cc |
| N-methyl-p-aminophenol sulfate | 2.5 g |
| Sodium sulfite, desiccated | 30.0 g |
| Hydroquinone | 2.5 g |
| Sodium metaborate | 10.0 g |
| Potassium bromide | 0.5 g |
| Water to make | 1.0 liter. |

15. In a photographic element according to claim 14 the further improvement wherein said dihydrospiropyran is present in a concentration of from 10$^{-2}$ to 10$^{-4}$ mole of nucleating agent per mole of silver.

16. In a process of producing by surface development a visible image in an imagewise exposed photographic element having a support and, coated on the support, a silver halide emulsion layer comprising silver halide grains capable of forming an internal latent image and, adsorbed to the surface of the silver halide grains, a nucleating agent in an amount sufficient to promote surface development of unexposed silver halide grains, the improvement comprising
developing in the presence of a dihydrospiropyran bis-condensation product of salicylic aldehyde and at least one heterocyclic ammonium salt.

17. A process of producing a direct-reversal dye image in a photographic element comprised of a support and at least one color-forming layer unit comprised of a dye-forming coupler and a silver halide emulsion layer containing silver halide grains capable of forming an internal latent image and, adsorbed to the surface of said silver halide a dihydrospiropyran nucleating agent of the formula

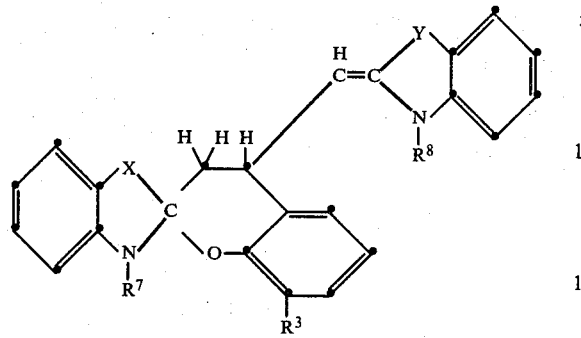

wherein

X and Y each independently represent a sulfur atom, a selenium atom or a —C(R$^1$R$^2$)— radical, R$^1$ and R$^2$ independently represent lower alkyl of from 1 to 5 carbon atoms or together represent an alkylene radical of 4 or 5 carbon atoms, R$^3$ represents hydrogen, a hydroxy radical or a lower alkyl or alkoxy radical of from 1 to 5 carbon atoms and R$^7$ and R$^8$ each represent an alkyl substituent of from 1 to 5 carbon atoms, comprising developing the photographic element in a surface developer having a pH in the range of from 10 to 13 containing a color-developing agent.

18. A process according to claim 17 in which the pH of the developer is maintained in the range of from 10.2 to 12.0.

19. A process according to claim 17 in which the surface developer contains a benzotriazole antifoggant.

20. A process according to claim 19 in which the surface developer contains a para-phenylenediamine color-developing agent and a reductone developing agent.

* * * * *